United States Patent [19]
Ohmura et al.

[11] Patent Number: 5,605,123
[45] Date of Patent: Feb. 25, 1997

[54] INTAKE PORT STRUCTURE IN INTERNAL COMBUSTION ENGINE

[75] Inventors: Ichirou Ohmura; Tohru Amemiya; Naomi Kurosaki, all of Wako, Japan

[73] Assignee: Honda Giken Kogyo Kabushiki Kaisha, Tokyo, Japan

[21] Appl. No.: 582,063

[22] Filed: Jan. 2, 1996

[30] Foreign Application Priority Data

Jan. 9, 1995 [JP] Japan ................................ 7-001558

[51] Int. Cl.$^6$ ........................................... F02B 31/00
[52] U.S. Cl. ........................... 123/188.14; 123/306
[58] Field of Search ....................... 123/188.14, 306, 123/308

[56] References Cited

U.S. PATENT DOCUMENTS

| | | | |
|---|---|---|---|
| 5,195,488 | 3/1993 | Rattigan | 123/308 |
| 5,243,936 | 9/1993 | Kobayashi | 123/188.14 |
| 5,245,964 | 9/1993 | Matsuo et al. | 123/306 |
| 5,265,568 | 11/1993 | Nakagawa | 123/306 |
| 5,295,464 | 3/1994 | Ando et al. | 123/308 |
| 5,309,880 | 5/1994 | Mazella et al. | 123/306 |
| 5,335,634 | 8/1994 | Hashimoto et al. | 123/188.14 |

FOREIGN PATENT DOCUMENTS

| | | |
|---|---|---|
| 55-158226 | 11/1980 | Japan . |
| 59-179240 | 11/1984 | Japan . |
| 61-32483 | 7/1986 | Japan . |

*Primary Examiner*—Raymond A. Nelli
*Attorney, Agent, or Firm*—Nikaido, Marmelstein, Murray & Oram LLP

[57] ABSTRACT

A powerful swirl in intake air flowing into a combustion chamber in an internal combustion engine is generated to enhance combustion efficiency. An intake port portion has an axis which is eccentric with respect to an axis of a cylinder bore and inclined with respect to a plane perpendicular to the axis of the cylinder bore. The intake port portion is partitioned off from an adjacent port portion through a partition wall. A deflecting recess is formed in a lower surface of the intake port portion to extend from a point of an upstream end of the partition wall to a point in the vicinity of an intake opening. When an intake valve is opened during a low-load operation of the internal combustion engine, intake air flowing through the intake port portion is deflected by the deflecting recess to flow into the combustion chamber substantially in parallel to a top face of a piston. Thus, the intake air flowing into the combustion chamber cannot be reduced in a speed component in a tangential direction of the cylinder bore, and a powerful swirl can be generated.

22 Claims, 4 Drawing Sheets

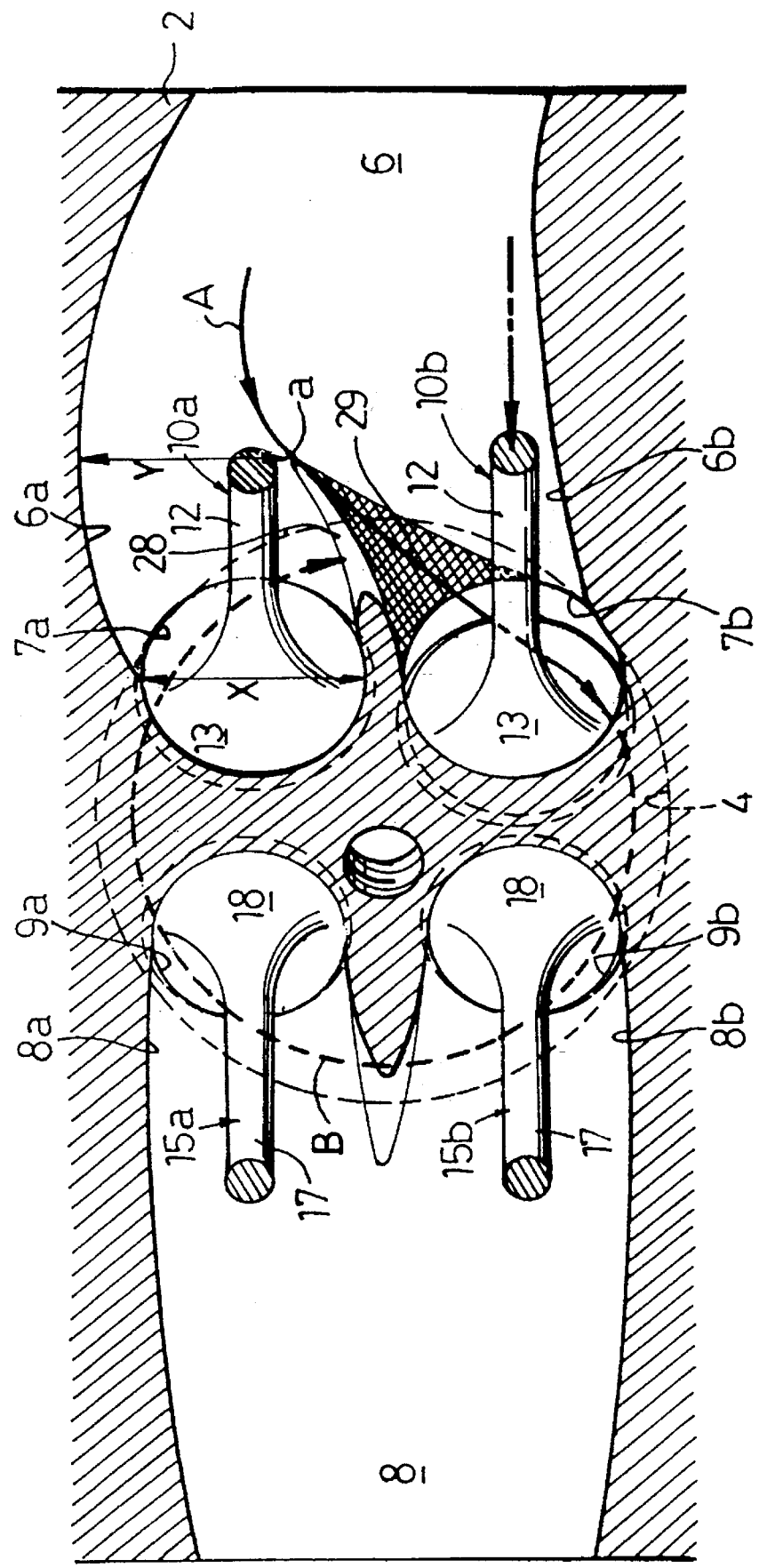

INTAKE PORT STRUCTURE IN INTERNAL COMBUSTION ENGINE

FIELD OF THE INVENTION

The present invention relates to an intake port structure in an internal combustion engine including an intake port having an axis which is inclined with respect to a plane perpendicular to an axis of a cylinder bore. A piston is slidably recevied in the cylinder bore. The intake port's axis is eccentric with respect to the axis of the cylinder bore. The intake port is connected to a combustion chamber through take openings which are opened and closed by intake valves.

BACKGROUND OF THE INVENTION

Various techniques are conventionally proposed in which a swirl is generated in a combustion chamber during a low-load operation of an internal combustion engine to enhance the combustion efficiency.

For example, an intake part structure is described in Japanese Utility Model Application Laid-open No. 158226/80, in which a projection is provided on an inner wall of an intake port in order to deflect a flow of intake air into a tangential direction of a cylinder bore to generate a swirl.

In addition, an intake port structure is described in Japanese patent Publication No.32483/86, in which a semi-spherical recess is provided in an inner wall of an intake port in order to deflect a flow of intake air into a tangential direction of a cylinder bore to generate a swirl.

Also, an intake port structure is described in Japanese Utility Model Application Laid-open No. 179240/84, in which two juxtaposed intake ports are connected by a communication passage which deflects a flow of intake air into a tangential direction of a cylinder bore to generate a swirl.

All of the conventionally proposed structures primarily aim at increasing the speed component of the intake air flowing into the combustion chamber in the direction of the tangential direction of the cylinder bore. However, all of these structures suffer from a problem that if the speed component in the tangential direction of the cylinder bore is large, i.e., if the intake air flows in a direction to collide against a top face of the piston, the speed component in the tangential direction is decreased, so that a sufficient swirl is not generated.

SUMMARY OF THE INVENTION

The present invention has been accomplished with such circumstances in view, and it is an object of the present invention to not decrease the speed component of the intake air flowing into the combustion chamber in the tangential direction of the cylinder bore to effectively generate a swirl.

To achieve the above object, according to a first feature of the present invention, there is provided an intake port structure in an internal combustion engine, comprising an intake port having an axis which is inclined with respect to a plane perpendicular to an axis of a cylinder bore in which a piston is slidably received, and which is eccentric with respect to the axis of the cylinder bore. The intake port is connected to a combustion chamber through an intake opening which is opened and closed by an intake valve. The intake port has a deflecting recess formed in its wall surface on the side of the cylinder bore in the vicinity of the intake opening for deflecting a flow of intake air flowing into the combustion chamber into a direction along the plane perpendicular to the axis of the cylinder bore.

With the first feature, the axis of the intake port is eccentric with respect to the axis of the cylinder bore and therefore, a swirl is generated in the intake air flowing into the combustion chamber. At this time, the flow of the intake air flowing into the combustion chamber is deflected into the direction along the top face of the piston. Therefore, the drop in flow speed of the intake air due to an interference with the intake valve is suppressed to a minimum. Most of the flow speed of the intake air is directed in the tangential direction of the cylinder bore. As a result, a sufficient swirl is generated to enhance the combustion efficiency.

According to a second feature of the present invention, in addition to the first feature, the intake port diverges in the vicinity of the combustion chamber into a plurality of port portions through a partition wall. The deflecting recess is formed in a wall surface of at least one port portion to extend from an upstream end of the partition wall to the combustion chamber.

With the second feature, the deflecting recess is formed to extend from the upstream end of the partition wall, partitioning the adjacent intake port portions, toward the combustion chamber. Therefore, the deflecting recess can be formed to extend smoothly toward the combustion chamber. This also makes it possible to eliminate the influence exerted on the flow of the intake air in the port portion adjoined by the deflecting recess.

According to a third feature of the present invention, in addition to the first and second features, the intake port diverges in the vicinity of the combustion chamber into a first port portion and a second port portion through a partition wall. During a low-load operation, intake air is supplied substantially through only the second port portion into the combustion chamber. During a high-load operation, the intake air is supplied through both of the first and second port portions into the combustion chamber. The partition wall is formed to extend toward the first port portion to a position in which the opening area of the intake opening of the first port portion is substantially equal to the effective opening area of the first port portion at the upstream end of the partition wall.

With the third feature, the partition wall extends toward the first port portion to the position in which the opening area of the intake opening of the first port portion is substantially equal to the effective opening area of the first port portion at the upstream end of the partition wall. Therefore, during high-load operation, the partition wall is prevented from resisting the intake air in the first port portion, and during low-load operation the flow of the intake air to the second port portion can be promoted to effectively generate a swirl.

According to a fourth feature of the present invention, in addition to the first through third features, the deflecting recess is formed to extend along a direction of the flow of intake air in the intake port.

With the fourth feature, the resistance to the intake air flowing along the deflecting recess can be alleviated.

BRIEF DESCRIPTION OF THE DRAWINGS

FIG. 5 is a view similar to FIG. 2, but according to a second embodiment.

DESCRIPTION OF THE PREFERRED EMBODIMENTS

The present invention will now be described by way of an embodiment with reference to the accompanying drawings.

Figure 1:
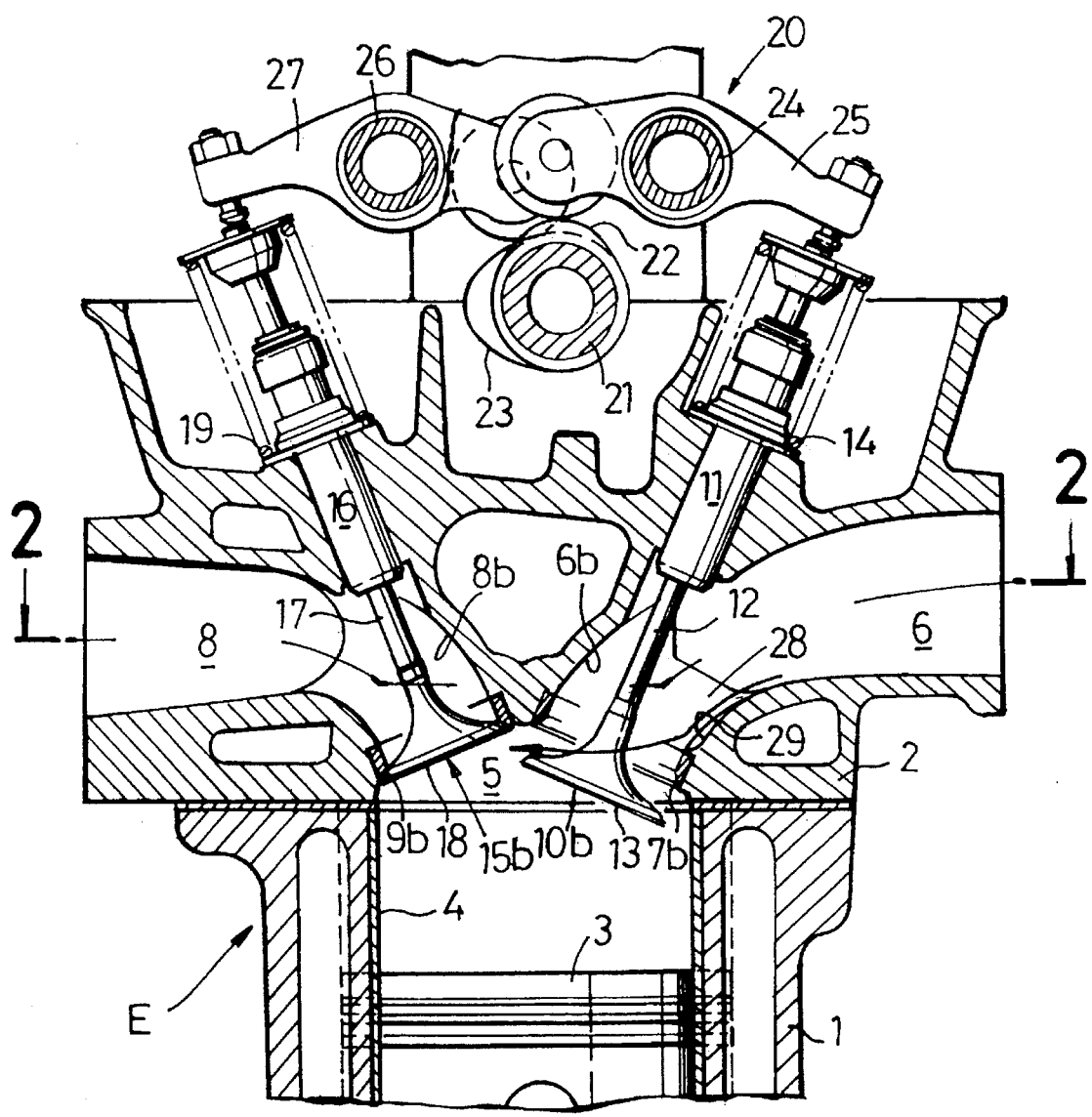
FIG. 1 is a vertical sectional view of a cylinder head section of an internal combustion engine.
Figure 2:
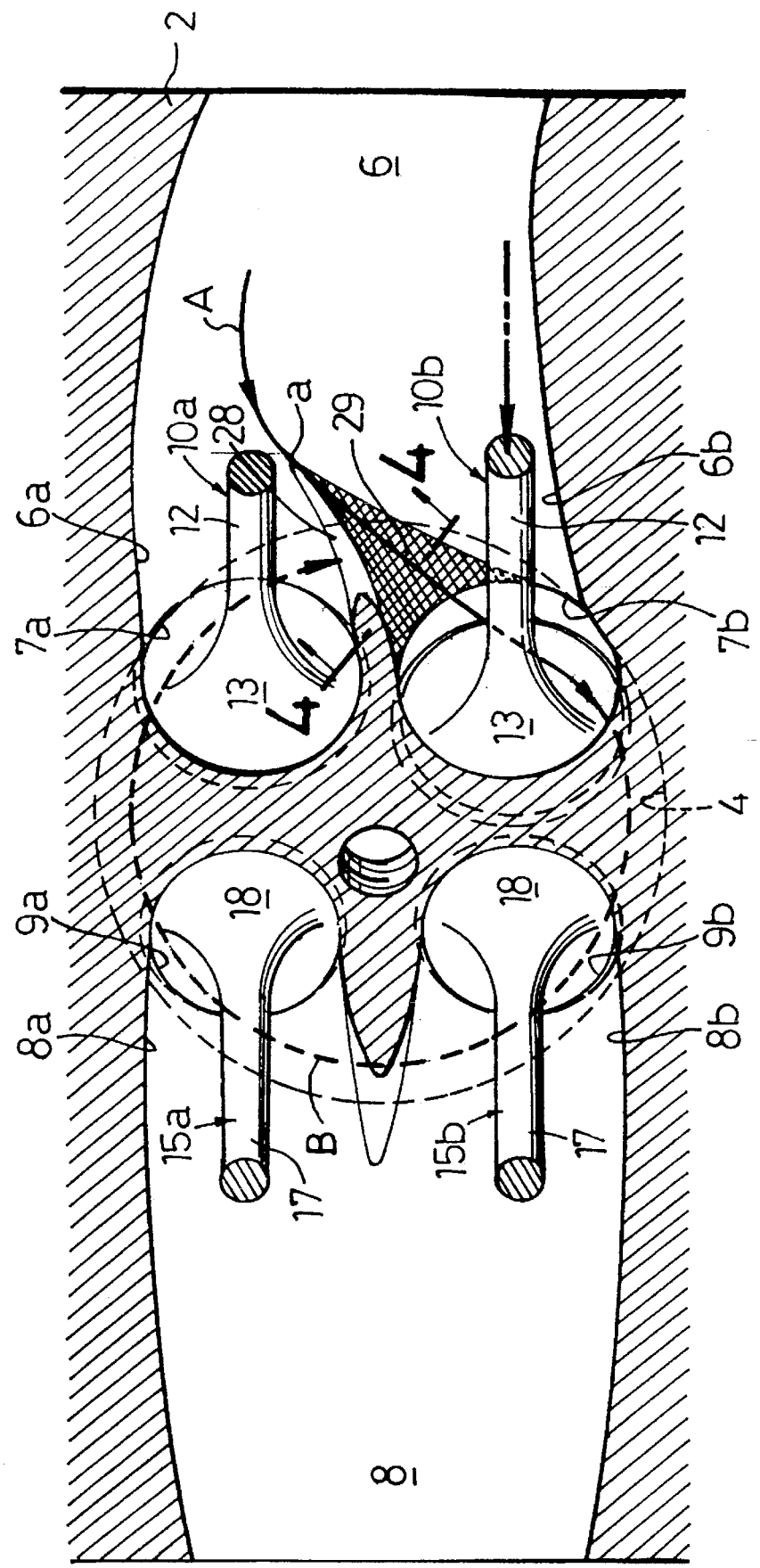
FIG. 2 is a sectional view taken along a line 2—2 in FIG. 1.

FIGS. 1 to 4 illustrate a first embodiment of the present invention. As shown in FIGS. 1 and 2, the internal combustion engine E includes a cylinder block 1, and a cylinder head 2 coupled to the cylinder block 1. A cylinder bore 4 is formed in the cylinder block 1. A piston 3 is slidably received in the cylinder bore 4. A combustion chamber 5 is formed in the cylinder head 2 and connected to the cylinder bore 4.

An intake port 6 is provided in the cylinder head 2 and diverges at a downstream side into a first port portion 6a and a second port portion 6b. A downstream end of the first port portion 6a communicates with the combustion chamber 5 through a first intake opening 7a formed by an intake valve seat. A downstream end of the second port portion 6b communicates with the combustion chamber 5 through a second intake opening 7b formed by an intake valve seat. An exhaust port 8 is formed in the cylinder head 2 and diverges at an upstream side into a first port portion 8a and a second port portion 8b. An upstream end of the first port portion 8a communicates with the combustion chamber 5 through a first exhaust bore 9a formed by an exhaust valve seat. An upstream end of the second port portion 8b communicates with the combustion chamber 5 through a second exhaust bore 9b formed by an exhaust valve seat.

A first intake valve 10a includes a stem 12 guided by a valve guide 11, and a head 13 which is capable of opening and closing the first intake opening 7a. The first intake valve 10a is biased in a closing direction by a valve spring 14. A second intake valve 10b includes a stem 12 guided by a valve guide 11, and a head 13 capable of opening and closing the second intake opening 7b. The second intake valve 10b is biased in a closing direction by a valve spring 14.

A first exhaust valve 15a includes a stem 17 guided by a valve guide 16, and a head 18 which is capable of opening and closing the first exhaust bore 9a. The first exhaust valve 15a is biased in a closing direction by a valve spring 19. A second exhaust valve 15b includes a stem 17 guided by a valve guide 16, and a head 18 capable of opening and closing the second exhaust bore 9b. The second exhaust valve 15b is biased in a closing direction by a valve spring 19.

A valve operating mechanism 20 for opening and closing the intake valves 10a and 10b and the exhaust valves 15a and 15b includes an intake cam 22 and an exhaust cam 23 which are provided on a single cam shaft 21. An intake rocker arm 25 is swingably carried on an intake rocker arm shaft 24. An exhaust rocker arm 27 is swingably carried on an exhaust rocker arm shaft 26. The pair of exhaust valves 15a and 15b are operated with the same timing and the same lift. However, the pair of intake valves 10a and 10b are operated in different manners during medium-load and high-load operations and during a low-load operation of the internal combustion engine. More specifically, during the medium-load and high-load operations, both the first and second intake valves 10a and 10b are operated, but during the low-load operation, the first intake valve 10a is brought into a substantially stopped state, and only the second intake valve 19b is operated. Such a valve operating mechanism 20 is conventionally well-known and hence, the detailed description thereof is omitted.

The downstream side of the intake port 6 is partitioned into the first port portion 6a and the second port portion 6b through a partition wall 28. A deflecting recess 29 is formed in a lower surface of the second port portion 6b (i.e., a wall surface of the cylinder bore 4) to extend in a direction of a flow of intake air. As can be seen from FIG. 3, an upstream end of the deflecting recess 29 starts from a point a at a base end of the partition wall 28, and a downstream end of the deflecting recess 29 terminates at a point a at an upper edge of the valve seat which defines the second intake opening 7b. A meshed portion in FIG. 2 is a region in which the deflecting recess 29 is formed. A depth of the deflecting recess 29 is moderately increased from the point a having a radius of curvature $R_1$ to a deepest point c. The depth is then decreased from the deepest point c to the point b which has a radius of curvature $R_2$ which is smaller than the radius of curvature $R_1$. The entire depth of the deflecting recess 29 is such that a sudden variation in sectional area of the second port portion 6b is not generated. As can be seen from a cross-sectional shape shown in FIG. 4, the deflecting recess 29 is smoothly contacted with tangential lines $t_1$ and $t_2$ at two points d and e having a center angle of 90° on a wall surface of the second port 6b. This arrangement also avoids a sudden variation in sectional area of the second port portion 6b.

As shown in FIG. 5, the first and second intake ports 6a and 6b at upstream of the partition wall 28 are curved in the opposite curving direction of the partition wall 28. With this arrangement, it is possible to make the cylinder head compact.

During the low-load operation of the internal combustion engine E, when the first intake valve 10a is stopped into a closed state and only the second intake valve 10b is opened, the intake air flowing through the intake port 6 is cut off by the closed first intake valve 10a, so that the air does not flow into the first port portion 6a, but flows into the second port portion 6b, as indicated by an arrow A in FIG. 2. The intake air flowing into the second port portion 6b flows along the deflecting recess 29 through the second intake opening 7b into the combustion chamber 5. At this time, the intake air flows in a tangential direction of the cylinder bore 4 to generate a swirl as shown by a dashed line arrow B in FIG. 2, because the sidewalls of the first and second port portions 6a and 6b are curved in the same direction toward the second intake opening 7b. Moreover, the second port portion 6b is eccentric from an axis $L_1$ of the cylinder bore 4. Further, an upstream end of the partition wall 28 extends in a manner that it is largely curved toward the first port portion 6a and hence, during the low-load operation, the intake air is liable to flow toward the second port portion 6b to further effectively generate a swirl.

Figures 3, 4:
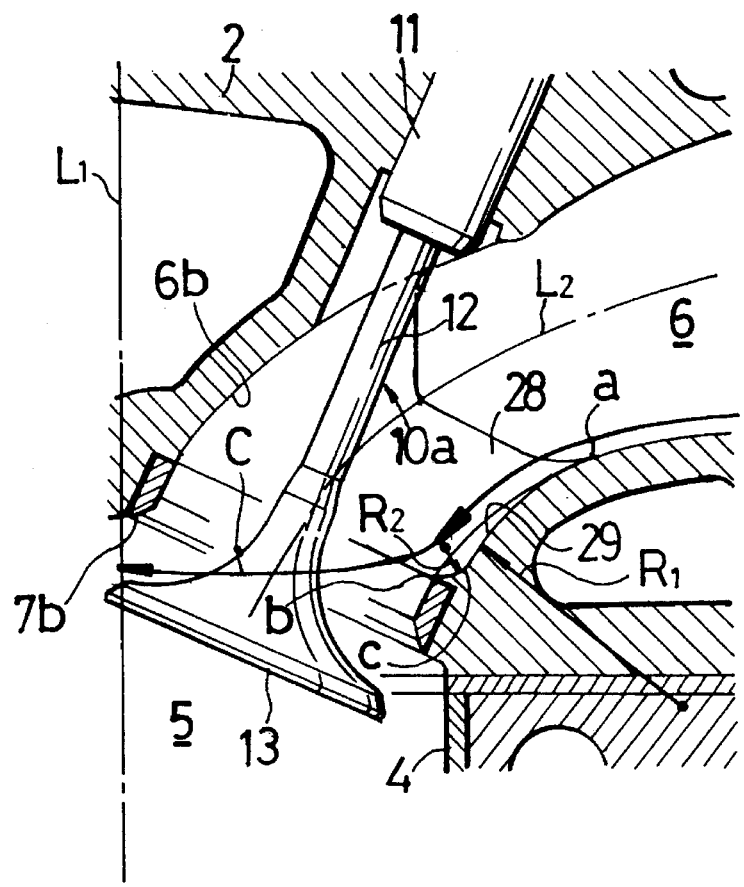
FIG. 3 is an enlarged view of essential portion shown in FIG. 1.
FIG. 4 is a sectional view taken along a line 4—4 in FIG. 2.

When the intake air flows through the second intake opening 7b into the combustion chamber 5, the intake air is deflected upwardly by the deflecting recess 29, as shown by an arrow C in FIG. 3, and flows into the combustion chamber 5 in parallel to the top or uppermost surface of the piston 3. Therefore, even during low-load operation in which the flow speed of the intake air is low, the intake air flowing into the combustion chamber 5 cannot be reduced in a speed component in a tangential direction of the cylinder bore 4, and a powerful swirl can be formed. Thus, the swirl can be maintained immediately before ignition to enhance the combustion efficiency.

The collision of the intake air against an upper surface of the head 13 of the second intake valve 10b is avoided because the intake air is upwardly deflected by the deflecting recess 29, as shown in FIG. 3. Thus, the drop in flow speed of the intake air flowing into the combustion chamber 5 can be alleviated to effectively generate the swirl. In addition, since the downstream end of the deflecting recess 29 is terminated immediately upstream of the valve seat, it is unnecessary to provide a recess in the valve seat, and the valve seat does not need to be increased in size, nor mounted in a complicated manner. Further, the center of the intake air flowing in a direction indicated by the arrow A along the deflecting recess 29 is directed outwardly of the stem 12 of the second intake valve 10b (i.e., radially outwardly with respect to the axis $L_1$ of the cylinder bore 4) and thus, the drop in flow speed of the intake air due to the collision of the intake air against the stem 12 of the second intake valve 10b is alleviated.

During medium-load or high-load operation of the internal combustion engine E, both of the first and second intake valves 10a and 10b are opened, so that the intake air flowing through the intake port 6 is diverted into the first and second port portions 6a, and 6b to flow into the combustion chamber 5 through the first and second intake openings 7a and 7b, respectively. At this time, the deflecting recess 29 cannot exert an influence on the intake air in the first port portion 6a, because the first and second port portions 6a and 6b are partitioned by the partition wall 28 and the defecting recess 29 starts from the point a at the base end of the partition wall 28.

FIG. 5 shows a second embodiment of the present invention.

In the second embodiment, the opening area of the intake opening 7a is set at a value equal to the effective opening area of the first port portion 6a at the upstream end of the partition wall 28 by setting the diameter X of the intake opening 7a of the first port portion 6a at a value equal to the width Y of the first port portion 6a at the upstream end of the partition wall 28. Thus, the partition wall 28 is prevented from resisting the intake air in the first port portion 6a during medium-load or high-load operation.

Of course, in addition to the above function and effect, the second embodiment has the function and effect possessed by the first embodiment.

As discussed above, according to the first feature of the present invention, the deflecting recess for deflecting the flow of the intake air, flowing into the combustion chamber, in the direction along the plane perpendicular to the axis of the cylinder bore is formed in the wall surface of the intake port on the side of the cylinder bore in the vicinity of the intake opening. Therefore, it is possible not only to suppress the drop in flow speed of the intake air due to the interference with the intake valve, but also to direct most of the flow speed of the intake air into the tangential direction of the cylinder bore. Thus, it is possible to maintain the initial swirl strength in the second half of a compression stroke following an intake stroke, or up to immediately before ignition, thereby enhancing the combustion efficiency.

According to the second feature of the present invention, the intake port diverges in the vicinity of the combustion chamber into the plurality of ports through the partition wall, and the deflecting recess is formed in at least one of the port portions to extend from the upstream end of the partition wall toward the combustion chamber. Therefore, not only is the deflecting recess formed to extend smoothly along the partition wall, but also it is possible to eliminate the influence exerted on the flow of the intake air in the port portion adjoined by the deflecting recess.

According to the third feature of the present invention, the intake port diverges in the vicinity of the combustion chamber into the first and second port portions through a partition wall, so that during low-load operation the intake air is supplied substantially through only the second port portion into the combustion chamber, and during high-load operation, the intake air is supplied through both of the first and second port portions into the combustion chamber. The partition wall is formed to extend toward the first port portion to the position in which the opening area of the intake opening of the first port portion is substantially equal to the effective opening area of the first port portion at the upstream end of the partition wall. Therefore, during high-load operation, the partition wall can be prevented from resisting the intake air in the first port portion, and during low-load operation, the flow of the intake air to the second port portion can be promoted to effectively generate the swirl.

According to the fourth feature of the present invention, the deflecting recess is formed to extend in the direction of the flow of the intake air in the intake port and therefore, it is possible to alleviate the resistance to the intake air flowing in the intake port.

Although the embodiments of the present invention have been described above, it will be understood that the present invention is not limited to the above-described embodiments, and various modifications in design may be made without departing from the spirit and scope of the invention defined in claims.

For example, although the internal combustion engine E including the two intake valves 10a and 10b have been exemplified in the embodiments, the present invention is applicable to an internal combustion engine including a single intake valve or three or more intake valves.

What is claimed:

1. An intake port structure in an internal combustion engine, comprising:

an intake port having an axis which is inclined with respect to a plane perpendicular to an axis of a cylinder bore in which a piston is slidably received, and said intake port axis is eccentric with respect to said axis of said cylinder bore, said intake port being connected to a combustion chamber through at least one intake opening which is opened and closed by at least one intake valve, wherein said intake port has a deflecting recess formed in a wall surface on a side of said cylinder bore in a vicinity of the at least one intake opening, said deflecting recess for deflecting a flow of intake air flowing into the combustion chamber into a direction along the plane perpendicular to the axis of the cylinder bore.

2. An intake port structure in an internal combustion engine according to claim 1, wherein said at least one intake port diverges in a vicinity of the combustion chamber into a plurality of port portions through a partition wall, and said deflecting recess is formed in a wall surface of at least one port portion to extend from an upstream end of said partition wall to said combustion chamber.

3. An intake port structure in an internal combustion engine according to claim 1, wherein said intake port diverges in a vicinity of the combustion chamber into a first port portion and a second port portion through a partition wall, and during a low-load operation, intake air is supplied substantially through only the second port portion into the combustion chamber, and during a high-load operation, the intake air is supplied through both of the first and second port portions and into the combustion chamber, and said partition wall is formed to extend toward the first port portion to a position in which the opening area of the intake opening of the first port portion is substantially equal to the effective opening area of the first port portion at the upstream end of said partition wall.

4. An intake port structure in an internal combustion engine according to claim 1, wherein said deflecting recess is formed to extend along a direction of the flow of intake air in the intake port.

5. An intake port structure in an internal combustion engine according to claim 2, wherein said intake port diverges in a vicinity of the combustion chamber into a first port portion and a second port portion through a partition wall, and during a low-load operation, intake air is supplied substantially through only the second port portion into the combustion chamber, and during a high-load operation, the intake air is supplied through both of the first and second port portions and into the combustion chamber, and said partition wall is formed to extend toward the first port portion to a position in which the opening area of the intake opening of the first port portion is substantially equal to the effective opening area of the first port portion at the upstream end of said partition wall.

6. An intake port structure in an internal combustion engine according to claim 2, wherein said deflecting recess is formed to extend along a direction of the flow of intake air in the intake port.

7. An intake port structure in an internal combustion engine according to claim 3, wherein said deflecting recess is formed to extend along a direction of the flow of intake air in the intake port.

8. An intake port structure according to claim 1, wherein said deflecting recess extending from a base end of a partition wall to an upper edge of a valve seat.

9. An intake port structure according to claim 1, wherein said deflecting recess extending from a base end of a partition wall to an upper edge of an intake opening.

10. An intake port structure according to claim 8, wherein a depth of the deflecting recess increases from the base end of the partition wall to a point near the upper edge of the valve seat and then decreases from the point near the upper edge of the valve seat to the upper edge of the valve seat.

11. An intake port structure according to claim 8, wherein said deflecting recess having a first radius of curvature extending from the base end of the partition wall to a point near the upper edge of the valve seat and a second radius of curvature from the point near the upper edge of the valve seat to the upper edge of the valve seat.

12. An intake port structure according to claim 11, wherein said first radius of curvature is larger than said second radius of curvature.

13. An intake port structure according to claim 9, wherein a depth of the deflecting recess increases from the base end of the partition wall to a point near the upper edge of the intake opening and then decreases from the point near the upper edge of the intake opening to the upper edge of the intake opening.

14. An intake port structure according to claim 9, wherein said deflecting recess having a first radius of curvature extending from the base end of the partition wall to a point near the upper edge of the intake opening and a second radius of curvature from the point near the upper edge of the intake opening to the upper edge of the intake opening.

15. An intake port structure according to claim 14, wherein said first radius of curvature is larger than said second radius of curvature.

16. An intake port structure in an internal combustion engine according to claim 8, wherein said deflecting recess is continuously formed smoothly with the intake port at upstream of the base end of said partition wall.

17. An intake port structure in an internal combustion engine according to claim 10, wherein a region of said deflecting recess where its depth is increasing and a region of said deflecting recess where its depth is reducing are smoothly connected in a vicinity of the upper edge of the valve seat.

18. An intake port structure in an internal combustion engine according to claim 1, wherein a direction of the intake air flowing into said combustion chamber is substantially parallel to the uppermost surface of a valve head of said intake valve.

19. An intake port structure in an internal combustion engine according to claim 1, wherein a direction of the intake air flowing into said combustion chamber is substantially parallel to an upper surface of said piston.

20. An intake port structure in an internal combustion engine according to claim 1, wherein the center of the intake air flowing into said combustion chamber is directed radially outwardly of a stem of said intake valve with respect to an axis of a cylinder.

21. An intake port structure in an internal combustion engine according to claim 1, said deflecting recess is smoothly contacted with tangential lines at two points having a center angle of 90° on a wall surface of said intake port.

22. An intake port structure in an internal combustion engine according to claim 3, said intake port at upstream of said partition wall is curved in the opposite curving direction of said partition wall.

* * * * *